May 5, 1964
L. BODDY
3,132,331
FLUID LEVEL SIGNAL SYSTEM
Filed Oct. 10, 1956
3 Sheets-Sheet 1
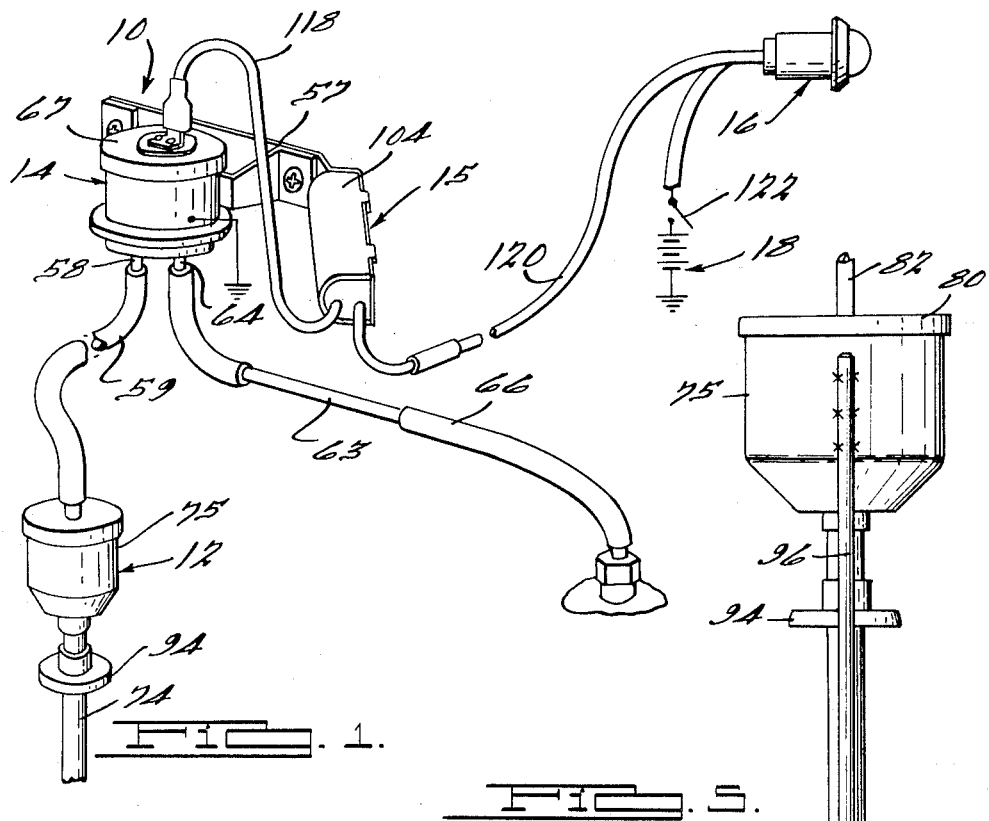
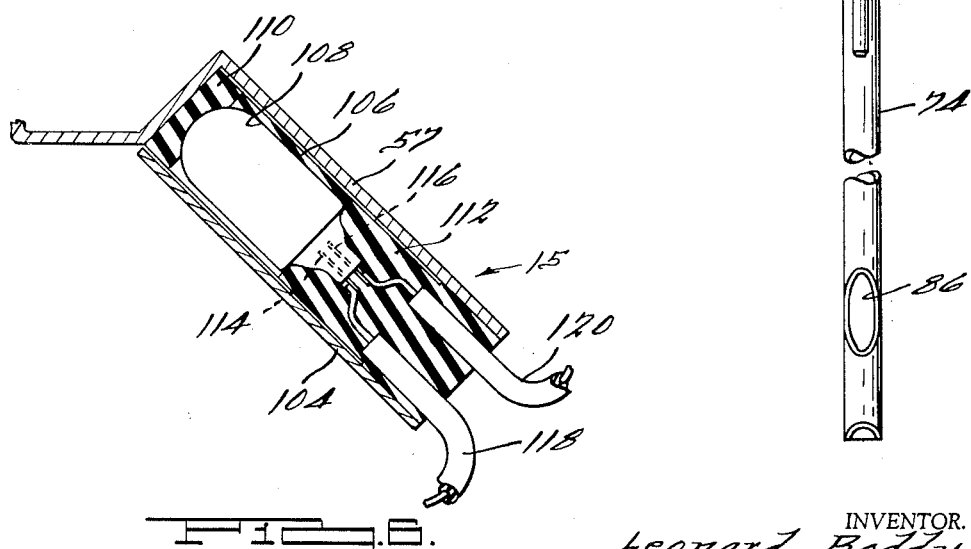
INVENTOR.
Leonard Boddy
BY
Harness, Dickey & Pierce
ATTORNEYS

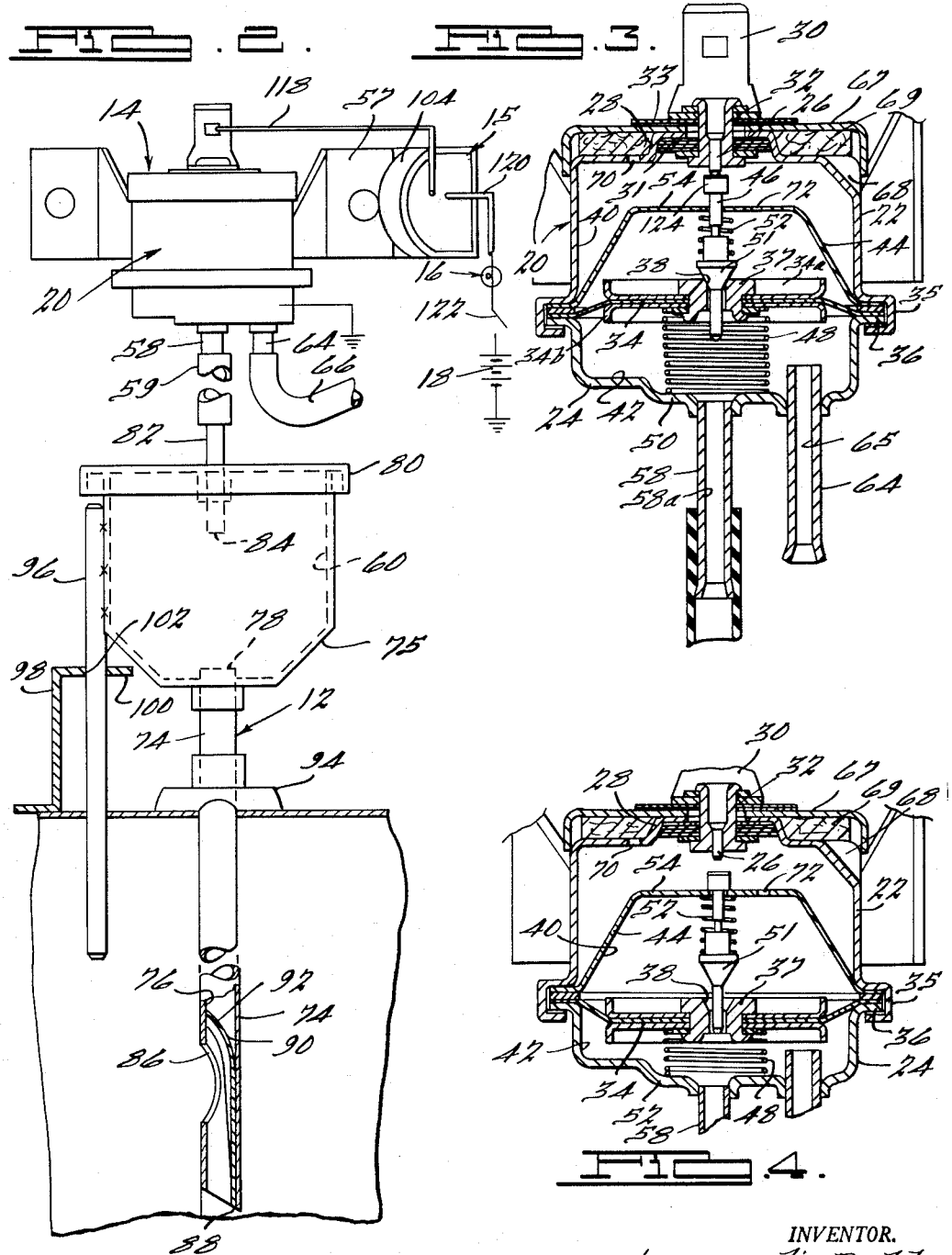

May 5, 1964  L. BODDY  3,132,331
FLUID LEVEL SIGNAL SYSTEM
Filed Oct. 10, 1956  3 Sheets-Sheet 3
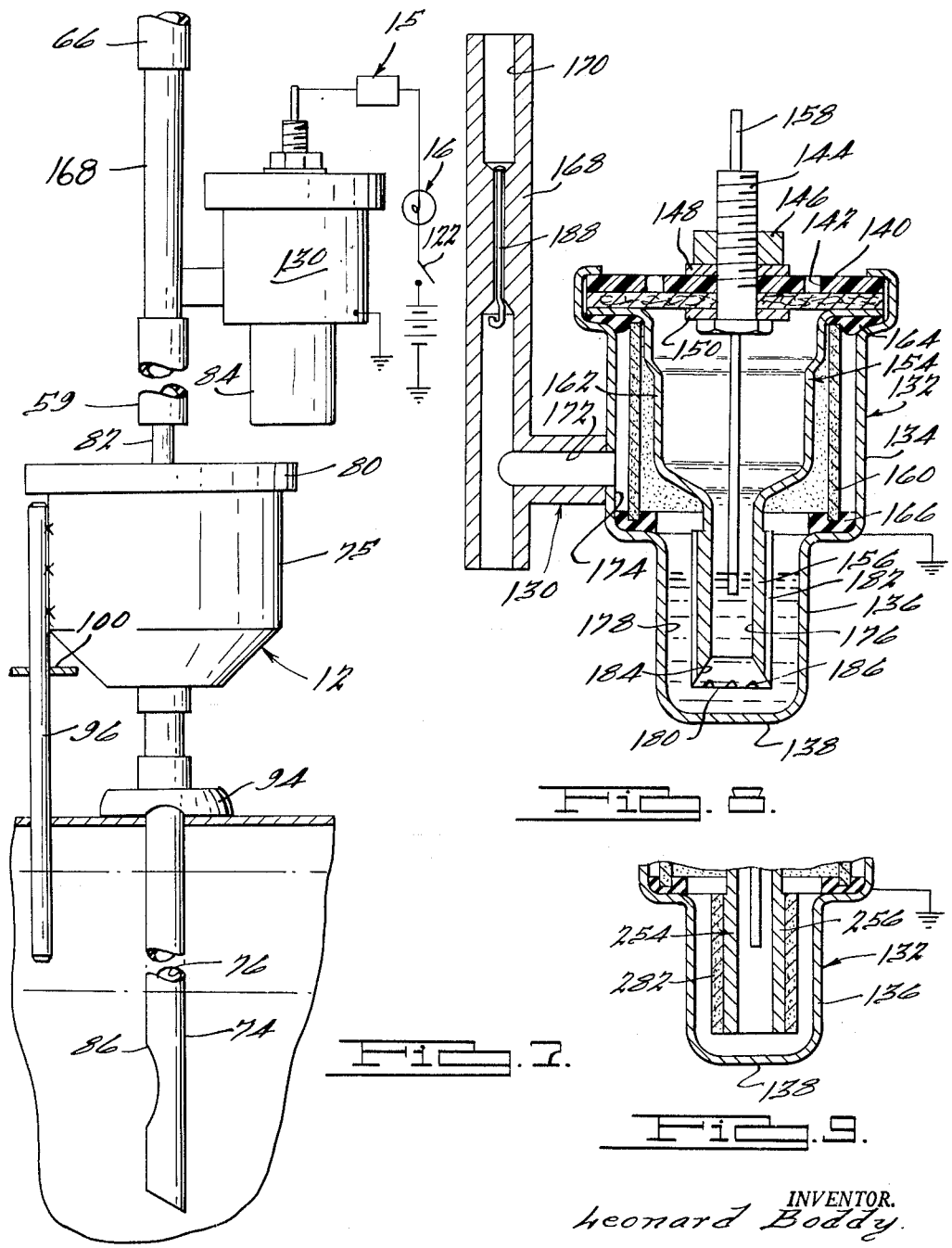
INVENTOR.
Leonard Boddy.
BY
Harness, Dickey & Pierce
ATTORNEYS.

United States Patent Office 3,132,331
Patented May 5, 1964

3,132,331
FLUID LEVEL SIGNAL SYSTEM
Leonard Boddy, Ann Arbor, Mich., assignor to King-Seeley Thermos Co., a corporation of Michigan
Filed Oct. 10, 1956, Ser. No. 615,137
11 Claims. (Cl. 340—244)

This invention relates to fluid level signal systems and, more particularly, to an improved fluid level signal system particularly adapted to provide a signal in the event the oil level in an internal combustion engine drops to a predetermined critical value.

An object of the present invention is to overcome disadvantages in prior fluid level signal systems of the indicated character and to provide an improved fluid level signal system that is reliable in operation, economical to manufacture and assemble, and durable.

Another object of the invention is to provide an improved liquid level signal system incorporating improved means accurately responsive to the attainment of a critical value of liquid level for positively rendering effective a source of power for actuating a signal mechanism.

Another object of the invention is to provide an improved liquid level signal system incorporating improved means for preventing the liquid from contaminating the electrical components of the system.

Another object of the invention is to provide an improved liquid level signal system incorporating improved means for preventing damage to the system in the event certain components are inverted.

Another object of the invention is to provide an improved liquid level signal system incorporating improved means for preventing transient signaling due to acceleration, deceleration or other forces applied to the liquid.

Another object of the invention is to provide an improved liquid level signal system incorporating improved means which enables the operator to ascertain whether the system is in proper operating order when the system is initially actuated.

Still another object of the invention is to provide an improved liquid level signal system which may be installed as a part of the original equipment on an automotive vehicle or which may be readily added as an accessory thereto without necessitating the modification of the vehicle engine.

The above as well as other objects and advantages of the present invention will become apparent from the following description, the appended claims, and the accompanying drawings, wherein:

FIGURE 1 is a perspective view of a liquid level signal system embodying the present invention;

FIG. 2 is an elevational view of a portion of the system illustrated in FIG. 1, showing the same installed in a fragmentarily illustrated engine block;

FIG. 3 is an enlarged sectional view of the liquid level responsive switch means illustrated in FIG. 2, showing the same in one operating position;

FIG. 4 is a sectional elevational view similar to FIG. 3 but showing the structure in another operating position;

FIG. 5 is an elevational view, with portions broken away, of the dip stick assembly illustrated in FIG. 1, showing the same in an angularly rotated position;

FIG. 6 is a longitudinal sectional view of the dynamic and attitude responsive switch illustrated in FIG. 1;

FIG. 7 is an elevational view of another embodiment of the invention;

FIG. 8 is a sectional view of a portion of the structure illustrated in FIG. 7; and FIG. 9 is a fragmentary sectional view of another embodiment of the invention.

Referring to the drawings, one embodiment of the invention is illustrated in FIGS. 1–6 thereof, and includes a signal system generally designated 10 which is particularly adapted to produce a signal in the event the oil level in the vehicle engine reaches a dangerously low level. The term signal is used herein in a generic sense, as comprehending various types of level-responsive actions. For example, these actions may be either electrical or mechanical and they may effect a control operation or produce a visual, audible or other indication.

The signal system 10 may be installed as a part of the original equipment of an automotive vehicle or may be added as an accessory thereto without necessitating the modification of the vehicle engine, and as shown includes a dip stick assembly, generally designated 12, a liquid level responsive switch, generally designated 14, a dynamic and attitude (i.e., a switch responsive to both movement and position changes) responsive switch assembly, generally designated 15, an electric signaling device 16, which may, for example, be an electric lamp, buzzer or other suitable device, and a source of electrical potential 18.

The switch 14 functions to complete an electric circuit through the signaling device 16 so as to energize the signaling device to warn the vehicle operator when the oil reaches a dangerously low level in the vehicle engine. The switch 14 is comprised of a housing 20 which is preferably mounted on the fire wall of the vehicle, and the housing 20 includes confronting, generally cup-shaped members 22 and 24 that may be formed, for example, as metal stampings. A contact 26 is fixed to the top wall 28 of the member 22 and is electrically connected to an exposed terminal 30 by a rivet 32, electrically insulated from the member 22, as by washers 31 and 33.

A diaphragm 34 is provided, the marginal portions of which are fixed between the members 22 and 24, as by crimping the portion 35 of the wall of the member 22 over an outwardly extending flange portion 36 provided on the member 24. The diaphragm 34 divides the housing into chambers 40 and 42 and carries a centrally disposed valve seat 37 having an opening 38 therethrough which interconnects the chambers 40 and 42 in the housing 20. Diaphragm 34 is preferably quite thin in order to render the structure quite sensitive. In order to render the central section which receives the valve seat 37 quite stable and to increase the effective area of the diaphragm, the diaphragm 34 is clamped between a pair of oppositely facing light metallic cup-shaped members 34a and 34b, which elements and the diaphragm are held in assembled relation to each other by the valve seat 37.

An inverted, generally cup-shaped guide member 44 is provided which overlies the diaphragm 34 and the marginal portions of which are crimped between the portions 35 and 36 of the members 22 and 24. The guide member 44 supports a pin 46 which serves as a movable electrical contact and which also serves as a valve that seats against the valve seat 37 and closes the opening 38 therethrough. A coil spring 48 is provided which is interposed between the diaphragm 34 and the bottom wall 50 of the member 24 so as to yieldingly urge the diaphragm upwardly as viewed in FIGS. 3 and 4 against the generally frusto-conical valve head portion 51 provided on the pin 46. A coil spring 52 is also provided which is mounted on the pin 46, one end of the spring 52 bearing against the upper wall 54 of the guide member 44 while the opposite end of the spring bears against the frusto-conical valve head portion 51 of the pin 46 so as to urge the pin downwardly, as viewed in FIGS. 3 and 4, against the valve seat 37. When the components of the switch 14 occupy the positions illustrated in FIG. 3, an electrical path is provided from the terminal 30 through the fixed contact 26, the pin 46, the spring 52, the guide member 44 and the member 22 which is grounded to the frame of the vehicle, as by the bracket 57, which may be mounted, for example, on the fire wall of the associated vehicle.

A centrally disposed tube 58 is provided which is fixed to the bottom wall 50 of the member 24 and which extends downwardly therefrom, as viewed in FIGS. 1–4, the bore 58a of the tube 58 communicating with the chamber 42 in the housing 20. The lower end portion of the tube 58 is connected by a flexible hose 59 to a chamber 60 provided in the dip stick assembly 12, as will be described hereinafter in greater detail.

A vacuum fitting 64 is also provided which is fixed to the bottom wall 50 of the member 24 at a position spaced from the tube 28, the bore 65 of the fitting 64 also communicating with the chamber 42. A flexible hose 66 is provided, one end portion of which is connected to the fitting 64 while the opposite end of the hose 66 is connected to the intake manifold of the vehicle engine. The rate of air flow through the hose 66 is preferably in the order of 100 cc. per minute, and such air flow is governed by a restrictor 63 in the hose 66 which serves to reduce the cross sectional area thereof so that the rate of air flow therethrough is reduced to the desired value. Restrictor 63 may, if desired, be constructed as described below with reference to restrictor 188 of FIG. 8.

A cap member 67 spacedly overlies the top wall 28 of the member 22 and is secured thereto by the rivet 32. The peripheral portion of the member 22 is provided with a plurality of circumferentially spaced indentations 68 which permit air to flow under the cap 67 and through a filter 69 which may be made of felt or other suitable material, the filter 69 being interposed between the cap 67 and the top wall 28 of the member 22 so as to entrap dirt, moisture and other foreign matter. In order that air may flow from atmosphere through the indentations 68, the filter 69 and into the chamber 40, a plurality of openings 70 and 72 are provided in the wall 28 of the member 22 and the wall 54 of the guide member 44, respectively.

The dip stick assembly 12 includes an elongate tubular dip stick 74 adapted to be inserted in the dip stick passageway conventionally provided in the engine blocks of internal combustion engines. While the tubular dip stick 74 is shown as being substantially straight and as being circular in transverse cross-section, it will be understood that the tubular dip stick may be formed on an arc of a circle and adapted to be inserted in a curvilinear dip stick passageway having substantially the same radius of curvature as the curvilinear dip stick. It will also be understood that the cross-sectional configuration of the tube may be other than circular. The dip stick assembly 12 also includes a housing 75 which defines the chamber 60, the housing 75 being secured to one end portion of the tubular dip stick 74 so that the bore 76 of the dip stick communicates with the chamber 60. The tubular dip stick preferably projects into the chamber 60 and terminates in spaced relationship with respect to the bottom wall of the housing 75, as at 78. The housing 75 is also provided with a cover 80 which carries a fitting 82 that extends through the cover and into the chamber 60, as at 84. The outer end portion of the fitting 82 is connected to the flexible hose 59.

An opening 86 is provided in the wall of the tubular dip stick at a position near, but spaced from, the end 88 thereof remote from the housing 75, the uppermost edge of the opening 86 being located at the critical oil level when the dip stick is positioned in the engine block. In accordance with known practice, and as shown in FIGS. 2 and 5, the opening 86 is formed by notching one side of tube 74 and so is generally elliptical. The narrow but flaring upper end insures a breaking of the meniscus and a prompt starting of the drainage of oil from tube 74 as soon as the oil level falls below the upper end of opening 86. Such a construction insures easy and complete drainage of oil from the tube when the oil level falls below the upper end of the opening 86. In order to constrict the bore 76 so as to limit the rate of flow of oil out of the bore, an elongate relatively thin restrictor 90 may be fitted in the bore, the restrictor 90 having a diagonally extending portion 92 which projects across the bore so as to reduce the cross-sectional area thereof at a position adjacent the upper edge of the opening, as viewed in FIGS. 2 and 5. The cross-sectional area of the bore of the tubular dip stick is preferably reduced so that a period of at least five or six seconds is required for the oil in the bore of the dip stick to drain completely out of the dip stick. In accordance with the invention described and claimed in Tyner United States application, Serial No. 615,138, filed October 10, 1956, issued February 20, 1962 as U.S. Patent 3,022,497 and assigned to the assignee hereof, restrictor 90 may be temperature responsive so as to render the discharge rate of oil from tube 74 partially or entirely insensitive to changes in oil temperature and viscosity.

For the purpose of limiting the longitudinal movement of the tubular dip stick in the dip stick passageway in the engine block, an abutment stop 94 is provided at a position near the housing. In order that the opening 86 in the dip stick 74 may be located in a predetermined angular position in the dip stick passageway in the engine in the engine block, a locating rod 96 is provided, one end portion of which is fixed to the housing 75. The longitudinal axis of the locating rod 96 extends substantially parallel to the longitudinal axis of the tubular dip stick 74, and the rod 96 is angularly aligned with the opening 86. A locating bracket 98 is provided which is fixed to the engine block by any desired means, the bracket 98 having an outwardly projecting flange portion 100 defining an opening 102 adapted to receive the locating rod when the tubular dip stick is in the correct angular position relative to the engine block. It will be appreciated, however, that any other suitable means may be employed for locating the opening 86 in the dip stick in a desired position in the engine block. For example, the dip stick may be curvilinear and adapted to be inserted in a curvilinear dip stick passageway, as previously mentioned, or the transverse cross-sectional configuration of the dip stick and dip stick passageway may be such that the dip stick can only be inserted in the passageway in one predetermined angular position relative to the passageway.

The dynamic and attitude responsive switch 15 is preferably mounted on a forwardly extending extension of the bracket 57 and includes a generally U-sectioned housing 104 in which is mounted bulb 106 which defines a chamber 108 that is partially filled with mercury. The term attitude is used, in connection with the illustrative embodiment, in the sense of vehicle position on the earth's surface and in relation to the reference attitude which is that of a vehicle on level ground as hereinafter disclosed in detail. When the vehicle is on level ground, the respective ends of bulb 106 are at approximately the same level. The bulb 106 is preferably formed of glass and is resiliently supported in the housing by a resilient disk 110 and potting compond 112 so as to minimize the effect of vibrational and shock forces which may be imparted to the switch 15. A pair of electrodes 114 and 116 are provided which project into one end of the chamber 108, and the level of the mercury in the chamber is such that an electrical path is provided through the mercury between the electrodes 114 and 116 when the switch 15 and the vehicle in which it is mounted are in a normal level attitude and the vehicle is at rest or operating at a substantially constant velocity. The configuration of the chamber 108 and the position of the electrodes therein are preferably empirically matched with the configuration of the oil reservoir of the particular engine with which the signal system is associated so that the body of mercury in the chamber tends to react in substantially the same manner as the body of oil in the engine reservoir when the dynamic or static forces acting thereon change due to acceleration or deceleration of the vehicle or to changes in the attitude of the vehicle, thereby breaking the electrical path between the electrodes. For example, in the event the vehicle is accelerating at a relatively rapid rate, the oil in the engine reservoir tends to flow to the rear end portion of the oil reservoir with the result that a false low oil level condition might be indicated. However, the configuration of the chamber 108 and the position of the electrodes 114 and 116 in the chamber are such that when the body of mercury flows to the rear of the chamber as a result of the acceleration, the electrical path between the electrodes 114 and 116 is broken thereby preventing the energization of the signaling device 16. The electrode 114 is connected to the terminal 30 of the switch 14 by a conductor 118 while the electrode 116 is connected to the signal lamp 16 by a conductor 120.

In the installation of the signal system 10, the switches 14 and 15 are preferably mounted on the fire wall of the vehicle by the bracket 57 which also serves to ground the housing 20 of the switch 14 to the vehicle frame. The vacuum fitting 64 is then connected to the intake manifold of the engine by the hose 66 while the tube 58 is connected by the flexible hose 59 and the fitting 82 to the chamber 60. The tubular dip stick 74 of the dip stick assembly 12 is then inserted, in the manner previously described, into the dip stick passageway provided in the vehicle engine block.

The signal device 16 is preferably mounted on the instrument panel or in any other suitable position on the vehicle where it commands the attention of the vehicle operator when energized, and the signaling device 16 may be connected to the source of potential 18 through a switch 122 which may, for example, be a part of the ignition switch of the vehicle.

In operation, the components of the switch 14 initially occupy the positions illustrated in FIG. 3. Assuming first that the oil level in the engine crankcase is in the safe driving range, so that the level of the oil is above the opening in the tubular dip stick, the initial closure of the switch 122 completes a circuit from the battery 18 through the signal lamp 16, the switch 15, the contact 26, the pin 46, the coil spring 52, the guide member 44, and the member 22 to ground, and the signaling device 16 is energized immediately thereby enabling the operator to ascertain that the signal system is in proper operating condition. When the vehicle engine is started, the pressure in the intake manifold is released thereby lowering the pressure in the chamber 42 of the switch 14 which is connected to the intake manifold through the hose 66. As the pressure in the chamber 42 is lowered, the oil in the engine crankcase or other reservoir will rise in the bore 76 of the tubular dip stick 74. Since the chamber 40 is at atmospheric pressure while the pressure in the chamber 42 is reduced, the pressure differential will cause the diaphragm 34 to move downwardly against the spring 48. The pin 46 will also move downwardly with the diaphragm 34 due to the action of the spring 52 so as to effect a separation of the pin 46 from the fixed contact 26, thereby interrupting the above-traced circuit and deenergizing the signaling device 16. The strength of the spring 48 is preferably such that it will permit the diaphragm to move downwardly to effect a separation of the pin 46 from the contact 26 after the oil has risen approximately three inches in the bore of the tubular dip stick. As the manifold pressure decreases, the diaphragm 34 and the pin 46 continue to move downwardly until the collar portion 124 on the pin 46 strikes the top wall 54 of the guide member 44, thereby halting the downward movement of the pin 46. The diaphragm 34 is free to continue its downward movement however, so that the valve seat 37 moves away from the frusto-conical portion 51 of the pin 46 thereby opening the passageway 38 and permitting atmospheric air to bleed through the passageway 38 into the chamber 42. This opening of the valve preferably takes place when the oil has risen approximately eight inches in the dip stick, such height being equivalent to approximately one half inch of mercury and being well below the position of the chamber 60. As the engine operates, air will continue to bleed through the passageway 38 into the chamber 42 thereby maintaining the reduction in pressure in the chamber 42 at approximately one half inch of mercury irrespective of manifold vacuum.

Assuming that the oil level in the engine crankcase falls below the aperture 86 in the tubular dip stick, the oil will drain out of the bore 76 of the tubular dip stick thereby permitting air to flow from the engine crankcase through the bore 76 of the dip stick into the chamber 42 so as to raise the pressure in the chamber 42 to substantially atmospheric pressure. With the pressure differential eliminated, the spring 48 urges the diaphragm 34 upwardly to close the passageway 38, while the spring 52 urges the pin 46 against the valve seat 37 so that the pin 46 moves upwardly with the diaphragm 34 and contacts the fixed contact 26. When the pin 46 contacts the fixed contact 26, the electrical circuit through the switch 14 is completed thereby causing the signal device 16 to be energized so as to warn the operator that the oil level is dangerously low.

The above-described arrangement is critically and accurately responsive to oil level. The opening or closing of the signal contacts 26, 46 occurs in response to a very small change in oil level, from a value just sufficient to cover opening 86 to a value at which enough of opening 86 is exposed to admit air at the rate at which it is extracted through tube 66. This small change in oil level renders the manifold vacuum effective or ineffective to act on diaphragm 34. At the same time, as previously explained, the arrangement eliminates transient signals due to temporary changes in oil level since a period of approximately five or six seconds is required for the oil to drain completely out of the tubular dip stick.

The dynamic and attitude responsive switch 15 also eliminates transient signals due to changes in the oil level brought about by acceleration or deceleration forces or changes in the attitude of the vehicle, as previously described, the switch 15 functioning to open the circuit to the signaling device 16 so as to prevent transient energization of the device 16 even though the contacts in the switch 14 closes as a result of oil draining completely out of the tubular dip stick. Such a construction is advantageous when, for example, the vehicle is ascending a relatively long hill so that the oil in the engine tends to flow to the rear end portion of the oil reservoir. Since the mercury in the switch 15 also tends to flow to the rear end portion of the switch while the electrodes are disposed at the forward end portion thereof, in the embodiment illustrated, the electrical path between the electrodes 114 and 116 is broken and the signaling device 16 cannot be energized.

In the event that the oil level is relatively low and splashing of the oil occurs, it is possible for oil to splash into the bore 76 of the tubular dip stick 74 through the opening 86 therein. The chamber 60 interposed between the switch 14 and the tubular dip stick prevents such slugs of oil from passing into the chamber 42, the slugs of oil which pass through the bore 76 of the tubular dip stick being separated from the air in the chamber 60.

When the dip stick 12 is withdrawn from the crankcase, as in checking the oil level, it may be inverted. Reservoir 60 performs the additional function, under such circumstances, of preventing any oil present in the tube 74 from flowing into the base of switch 14. The lower end 84 of tube 82 extends below the upper inner surface of chamber 60 sufficiently far to provide a reservoir of sufficient capacity, to hold any oil that might be so entrained in tube 74. However, as a further precaution to prevent oil from flowing into the vacuum line 66, the upper end portion of the fitting 64 terminates in upwardly spaced relationship with respect to the bottom wall 50 of the member 24 thereby providing an additional reservoir for any oil which might pass into the chamber 42.

It will be noted that the downwardly extending side walls of the guide member 44 and the side walls of the member 22 define an annular space which serves to entrap water which may flow through the filter 69 and the openings 70 thereby preventing such water from entering into the chamber 40 and reducing the possibility of the valve and the valve seat corroding.

Another embodiment of the invention is illustrated in FIGS. 7 and 8. This embodiment of the invention includes the dip stick assembly 12, the dynamic and attitude responsive switch 15, the signaling device 16 and the source of potential 18. In this embodiment of the invention, a switch 130 is provided which may be substituted for the switch 14 previously described, the switch 130 being used in conjunction with the dip stick assembly 12, the dynamic and attitude responsive switch 15 and the signaling device 16 described hereinabove. In this embodiment of the invention, the switch 130 is comprised of a housing 132 having a substantially cylindrical central portion 134 and a reduced diameter end portion 136 closed by a bottom wall 138. The upper end of the housing is closed by a cap member 140 having openings 142 therein. A centrally disposed terminal 144 is secured to the cap member 140 by a nut 146 which threadably engages external threads provided on the terminal 144. The terminal 144 is electrically insulated from the cap member by washers 148 and 150, and a filter 152 which may be formed of felt or other suitable material is fitted between the cap member and the upper end portion of the housing 132. A generally funnel-shaped member 154 is inserted in the housing 132 in coaxial relationship therewith, the lower end portion 156 of the member 154 projecting downwardly into the reduced diameter portion 136 of the housing and terminating in upwardly spaced relationship with respect to the bottom wall 138. An axially extending electrode 158 is provided which extends through the terminal 144 and partially through the funnel-shaped member 154, the lower end portion of the electrode 158 terminating in upwardly spaced relationship with respect to the lower end of the member 154, as viewed in FIG. 8. The reduced diameter portion 136 of the housing is initially filled with mercury to a level such that the mercury contacts the lower end portion of the electrode, as viewed in FIG. 8. A sleeve-type filter 160 is provided which is preferably formed of sintered nickel or other material which will not amalgamate with mercury but which permits the passage of air therethrough with a minimum pressure drop. The filter 160 is interposed between the upper end portion 162 of the member 154 and the portion 134 of the housing 132, the ends of the filter engaging gaskets 164 and 166 so as to form air-tight seals at the ends of the filter. The filter 154 thus prevents the passage of mercury therethrough but permits air to pass therethrough with relatively little pressure drop, and it will be appreciated that the particular position of the filter may be varied.

A generally T-shaped connector member 168 is provided having a vertically extending passageway 170 and a horizontally extending passageway 172. The member 168 is fixed to the housing by any suitable means, one end of the passageway 172 communicating with the annular space 174 intermediate the member 154 and the housing 132, while the other end of the passageway 172 communicates with the vertically extending passageway 170. The upper end portion of the passageway 170 is connected to the intake manifold of the automobile engine by the hose 66 while the lower end portion of the passageway is connected by the hose 59 to the chamber 60 of the dip stick assembly 12 in the manner previously described.

As previously mentioned, the reduced diameter portion 136 of the housing is initially filled with mercury to a level such that an electrical path is provided from the electrode through the mercury to the housing 132 which is grounded to the frame of the vehicle.

In the operation of this embodiment of the invention, when the ignition switch 122 is initially closed a circuit is completed from the battery 18 through the signaling device 16, the switch 15, the electrode 158, the mercury and the housing 132 to ground, and the signaling device 16 is energized immediately thereby enabling the operator to ascertain that the signal system is in proper operating condition. When the engine is started, the pressure in the intake manifold is reduced. Assuming that the oil level in the engine crankcase is above the aperture 86 in the tubular dip stick 74, this reduction in manifold pressure reduces the pressure in the annular chamber 174 in the housing 132. The reduction in pressure causes the oil to rise in the tubular dip stick in the manner previously described and also causes the mercury in the bore 176 of the lower end portion 156 of the member 154 to fall below the lower end of the electrode 158 while the mercury in the annular space 178 between the housing 136 and the member 154 rises, thereby breaking the above traced circuit and deenergizing the signaling device. As the engine continues to operate, the level of the mercury in the bore 176 of the lower end portion 156 of the member 154 falls until it reaches the lower edge 180 thereof. It is a feature of the present invention that the periphery of the lower end portion 156 of the member 154 is provided with a plurality of circumferentially spaced serrations 182, and the bore 176 is enlarged to provide a generally frusto-conical portion 184. With such a construction, relatively small triangular openings 186 are provided at the lower edge 180 of the member 154 thereby permitting air to pass through the bore 176 which is open to atmosphere by reason of the openings 142 provided in the cap 140. The air flows upwardly along the serrations 182 so as to bleed into the annular chamber 174 to limit the reduction in pressure in the chamber 174 to approximately one-half inch of mercury. The provision of the serrations 182 in the lower end portion 156 of the member 154 substantially prevents bubbling of the air through the mercury, and substantially prevents the mercury from splashing into the bore 176 of the funnel-shaped member which splashing might effect transient signaling due to intermittent closure of the above-traced circuit.

As previously mentioned, the rate of air flow through the vacuum line to the intake manifold is preferably in the order of 100 cc. per minute, and such air flow may be governed by a restrictor 188 in the passageway 170. In the embodiment of the invention illustrated, the restrictor 188 is in the form of an elongate wire which extends coaxially of the passageway so as to reduce the cross-sectional area thereof. It will be understood, however, that the cross-sectional area of the passageway may be reduced by other means. For example, the air may flow through the interstices of a stranded wire covered with a substantially air tight insulating material, or the air may flow through felt blocks, sintered metal blocks, or other suitable material inserted in the passageway 170 so as to reduce the effective cross-sectional area thereof. It is preferred that only one of the restrictors normally be used in the passageway.

Assuming now that the level in the engine crankcase falls below the aperture 86 in the tubular dip stick 74, air from the engine crankcase will flow through the bore of the tubular dip stick thereby increasing the pressure in the chamber 174 with the result that the level of mercury rises in the bore 176 of the lower end portion of the member 154 to a position above the lower end of the electrode 158. When the mercury contacts the lower end of the electrode, the signal circuit is completed thereby effecting the energization of the signal device 16 to warn the operator that the oil is dangerously low.

Another modified form of switch construction is fragmentarily illustrated in FIG. 9.

In this embodiment of the invention, the serrations 182 and the frusto-conical portion 184 of the bore are eliminated, and a sleeve 282 which may, for example, be formed of sintered nickel or other suitable material which will not amalgamate with the mercury, is fitted over the lower end portion 256 of the member 254 so as to provide a path through which, when the mercury level falls below the lower end of member 254, the air may flow without causing bubbling of the mercury. In other respects, the construction of this embodiment of the invention may be the same as that of the switch 130.

While preferred embodiments of the invention have been shown and described, it will be understood that various changes and modifications may be made without departing from the spirit of the invention.

What is claimed is:

1. A signal system for responding to a critical liquid level condition, comprising a fluid pressure responsive control element, means for applying a fluid pressure differential to said control element, means including a fluid passage opened and closed by changes in liquid level for so modifying said fluid pressure differential as to actuate said control element, and means controlled by said control element for limiting said fluid pressure differential and maintaining said fluid pressure differential at a predetermined value.

2. A signal system for responding to a critical liquid level condition, comprising an element movably responsive to fluid pressure differentially applied to opposed surfaces thereof, means for applying a said differential pressure, means rendered effective by movement of said element for limiting said differential pressure and maintaining said fluid pressure differential at a predetermined value, and means including a passage opened and closed by changes in liquid level for modifying said differential pressure.

3. A signal system for responding to a critical liquid level condition, comprising a signal controlling element movably responsive to fluid pressures differentially applied to opposed surfaces thereof, means for applying atmospheric pressure to one said surface of said element, means normally effective to maintain the pressure at the other said surface of said element at a subatmospheric value to thereby cause said element to move in one direction, means defining a passage controlled by said liquid level for applying atmospheric pressure to said other surface of said element to thereby cause said element to move in the opposite direction, and means responsive to said first-mentioned movement of said element for maintaining said subatmospheric pressure at a predetermined value independently of variations in the pressure applied thereto.

4. A signal system for responding to the existence of a critical liquid level condition in an internal combustion engine, said system including an electric signal circuit, a signalling element in said circuit, means in said circuit for supplying electric current to said signalling element including a pair of contacts, pressure responsive means for actuating one of said contacts, means for applying a pressure differential to said pressure responsive means, means for limiting the pressure differential applied to said pressure responsive means and maintaining said pressure differential at a predetermined value independently of variations in the pressure applied by said means for applying a pressure differential, and means for varying the pressure differential applied to said pressure responsive means as a function of the liquid level.

5. A switch for use in a signal system adapted to respond to the existence of a critical liquid level condition, said switch comprising a housing, a first electric contact carried by said housing, diaphragm means in said housing dividing said housing into first and second chambers, valve means interconnecting said chambers and movable relative to said diaphragm, a second electrical contact adapted to make and break with said first contact and actuated by said valve means, means for limiting the movement of said valve means relative to said diaphragm means, and means for creating and maintaining a predetermined pressure differential between said chambers.

6. A dip stick assembly for use in a signal system for responding to the existence of a critical liquid level condition in an internal combustion engine having a dip stick passageway, said dip stick assembly including a housing defining a chamber, a tubular dip stick having a bore and fixed to said housing whereby the bore of said tubular dip stick communicates with the chamber defined by said housing, said tubular dip stick having an opening in the side wall thereof at a position spaced from the end thereof remote from the housing, the uppermost edge of the opening being located at a critical level of the liquid in the engine when the dip stick is positioned in the dip stick passageway of the engine, and means in the bore of said tubular dip stick for controlling the rate of flow of liquid through the bore of said tubular dip stick.

7. A dip stick assembly for use in a signal system for responding to the existence of a critical liquid level condition in an internal combustion engine having a dip stick passageway, said dip stick assembly including a housing defining a chamber, a tubular dip stick having a bore and fixed to said housing whereby the bore of said tubular dip stick communicates with the chamber defined by said housing, said tubular dip stick having an opening in the side wall thereof at a position spaced from the end thereof remote from the housing, the uppermost edge of the opening being located at a critical level of the liquid in the engine when the dip stick is positioned in the dip stick passageway of the engine, means for connecting said chamber to a source of pressure below ambient pressure, and means in the base of said tubular dip stick for controlling the rate of flow of liquid through the bore of said tubular dip stick.

8. A dip stick assembly for use in a signal system for responding to the existence of a critical liquid level condition in an internal combustion engine having a dip stick passageway, said dip stick assembly including a housing defining a chamber, a tubular dip stick having a bore and fixed to said housing whereby the bore of said tubular dip stick communicates with the chamber defined by said housing, said tubular dip stick having an opening in the side wall thereof at a position spaced from the end thereof remote from the housing, the uppermost edge of the opening being located at a critical level of the liquid in the engine when the dip stick is positioned in the dip stick passageway of the engine, means in the bore of said tubular dip stick for controlling the rate of flow of liquid through the bore of said tubular dip stick, and means for locating said tubular dip stick in a predetermined angular position in the dip stick passageway in said engine.

9. In combination with an engine oil measuring dip stick assembly in a vehicle comprising an elongated tubular dip stick having a central passage and adapted to be inserted by a longitudinal sliding action into a conventional dip stick passageway of internal combustion engines, a housing provided on the upper end of said tubular dip stick, a chamber provided in said housing and being connected to said central passage of said tubular dip stick, said tubular dip stick extending into said chamber and terminating in spaced relationship relative to the adjacent wall of said housing, a conduit extending into said chamber and terminating in spaced relationship relative to the adjacent wall of said housing, removable flexible hose means connecting said conduit to said liquid level responsive switch whereby said dip stick assembly may be separated from the combination and be removed from the dip stick passageway by disconnecting said flexible hose means from said conduit, and said conduit extending inwardly into said chamber a sufficient distance to prevent passage of oil into said conduit when said dip stick is removed from the dip stick passageway; a liquid level responsive switch to indicate the absence of a predetermined amount of oil; a dynamic and attitude responsive switch; a signalling device; electrical circuit means to actuate said signalling device; said liquid level responsive switch and said dynamic and attitude responsive switch being controllably connected to said first mentioned means, said liquid level responsive switch being adapted to cause actuation of said signalling device when the engine oil reaches a predetermined level, and said dynamic and attitude responsive switch being controllably connected to said first mentioned means to prevent actuation of said signalling device when said vehicle changes attitude from a normal level attitude or changes dynamic condition from one of rest or one of substantially constant velocity in a manner which would otherwise cause actuation of said signalling device during the presence of the predetermined amount of oil.

10. In combination with an engine oil measuring dip stick assembly in a vehicle; a signalling device; electrical circuit means to actuate said signalling device; a liquid level responsive switch to indicate the absence of a predetermined amount of oil comprising a chamber, a flexible diaphragm mounted in said chamber and being movable between first and second positions, spring means mounted on one side of said diaphragm and normally biasing said flexible diaphragm to said first position, contact means mounted on said flexible diaphragm and being movable therewith from a circuit-closing position in said first position to a circuit-opening position in said second position, a vacuum conduit connected to said chamber on said one side of said diaphragm, conduit means extending into the engine oil reservoir of said vehicle at one end and being connected to said chamber on said one side of said diaphragm at the other end, said one end of said conduit means being adapted to be filled with oil until a predetermined minimum oil level is attained in the engine oil reservoir, and engine vacuum means being connected to said vacuum conduit whereby a constant vacuum source is connected to said one side of said diaphragm and the presence of oil in said conduit means causes a vacuum to be created on said one side of said diaphragm to move said diaphragm from said first position to said second position and the absence of oil in said conduit means dissipates said vacuum on said one side of said diaphragm to permit said spring means to move said diaphragm to said first position to close said contact means and energize said signalling device; a dynamic and attitude responsive switch; said liquid level responsive switch and said dynamic and attitude responsive switch being controllably connected to said first mentioned means, said liquid level responsive switch being adapted to cause actuation of said signalling device when the engine oil reaches a predetermined level, and said dynamic and attitude responsive switch being controllably connected to said first mentioned means to prevent actuation of said signalling device when said vehicle changes attitude from a normal level attitude or changes dynamic condition from one of rest or one of substantially constant velocity in a manner which would otherwise cause actuation of said signalling device during the presence of the predetermined amount of oil.

11. The combination as defined in claim 10 and having means effected by movement of said diaphragm to said second position for maintaining said diaphragm in said second position until said vacuum is dissipated regardless of variations in said vacuum caused by variations in engine operation.

References Cited in the file of this patent
UNITED STATES PATENTS

| | | |
|---|---|---|
| 213,118 | Locke | Mar. 11, 1879 |
| 1,364,295 | Mitchell | Jan. 4, 1921 |
| 1,631,909 | Badin | June 7, 1927 |
| 1,642,318 | Williams | Sept. 13, 1927 |
| 1,913,436 | Eckstein | June 13, 1933 |
| 2,225,190 | Weaver et al. | Dec. 17, 1940 |
| 2,588,761 | Raby | Mar. 11, 1952 |
| 2,626,386 | Raby | Jan. 20, 1953 |
| 2,671,893 | Van Scory et al. | Mar. 9, 1954 |
| 2,728,070 | Kelly | Dec. 20, 1955 |
| 2,751,575 | Jacobs et al. | June 19, 1956 |
| 2,800,648 | Kelly | July 23, 1957 |
| 2,809,283 | Spencer | Oct. 8, 1957 |

OTHER REFERENCES

Ricardo text, "The Internal-Combustion Engine," vol. II (High Speed Engines), page 177, 1923.